Figure 1:
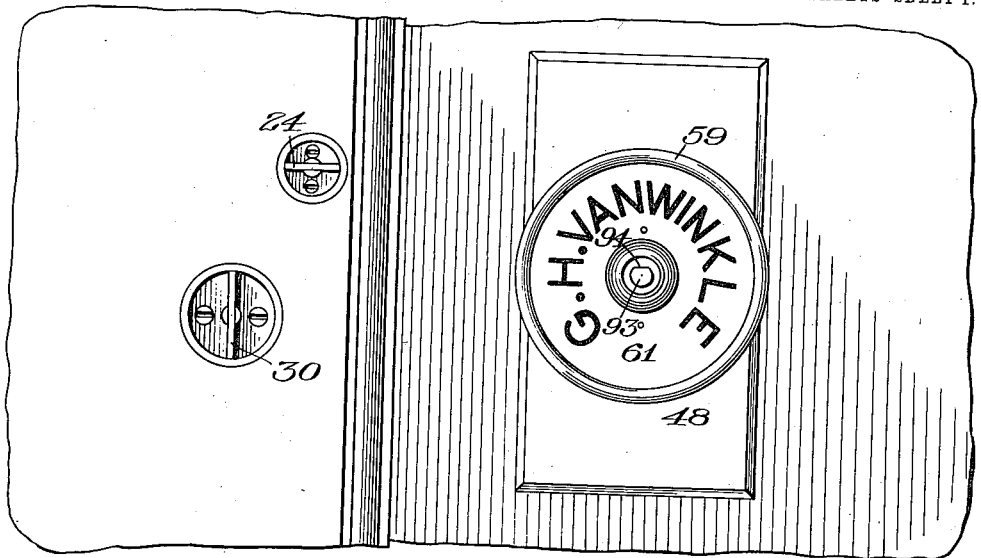

G. H. VAN WINKLE.
COMBINED LATCH AND LOCK.
APPLICATION FILED SEPT. 29, 1911.

1,128,392.

Patented Feb. 16, 1915.
5 SHEETS—SHEET 1.

Witnesses
Walter B. Payne
H. E. Stonebraker

Inventor
George H. Van Winkle
By Church Rich
his Attorneys

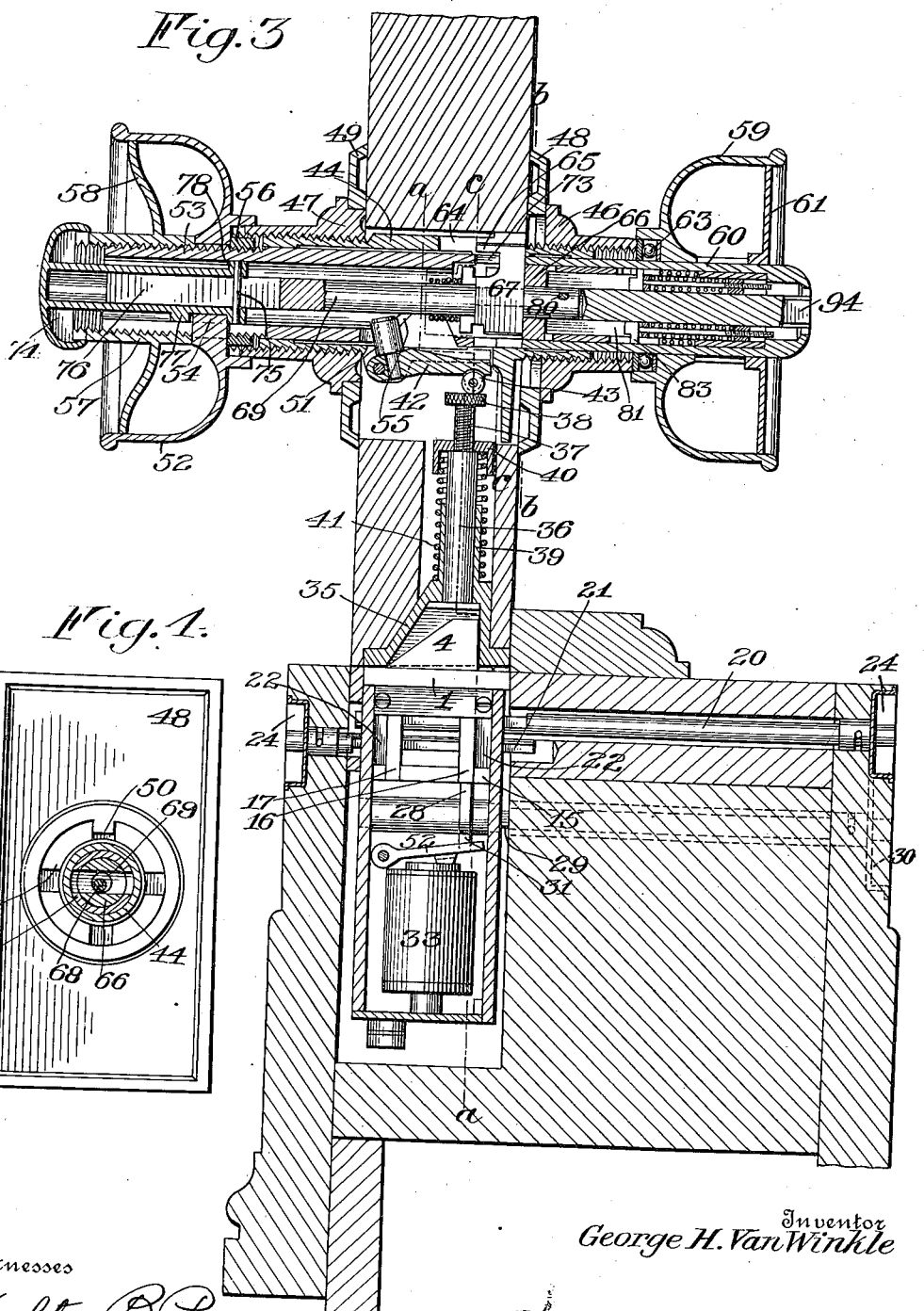

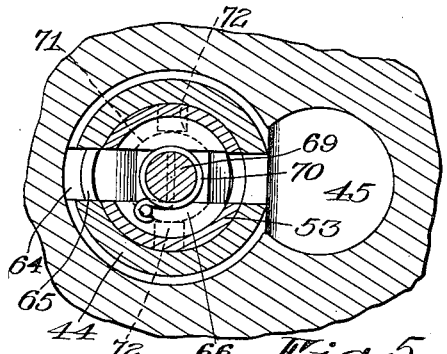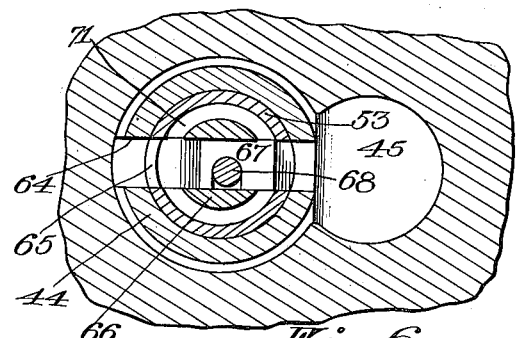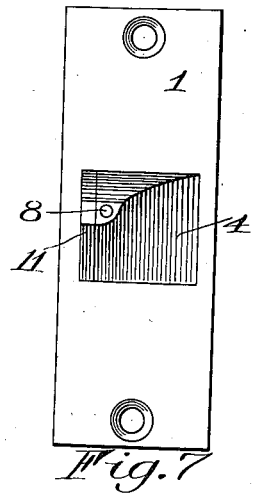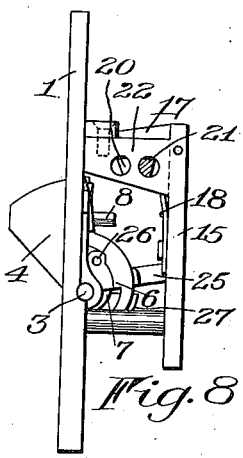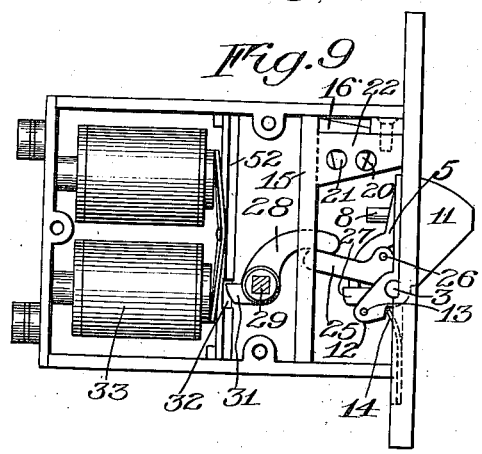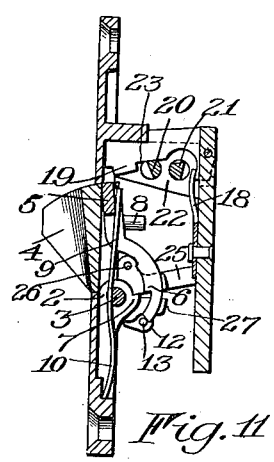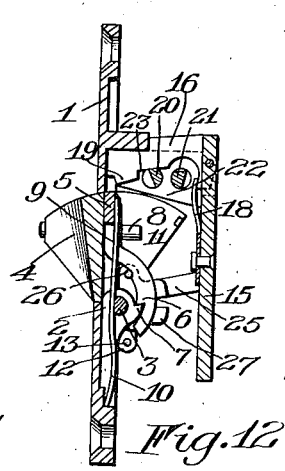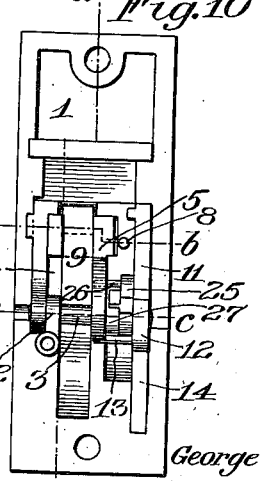

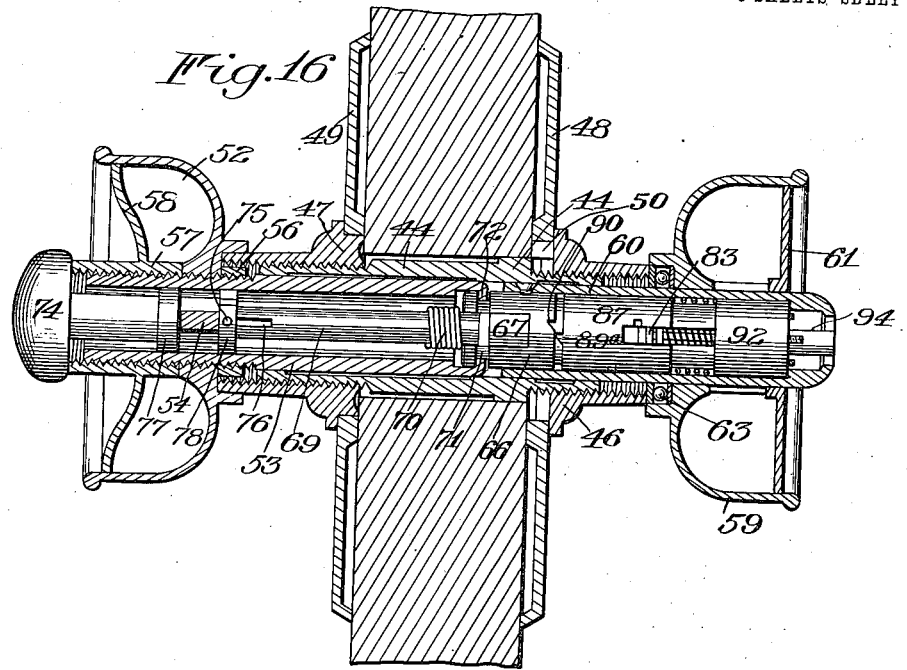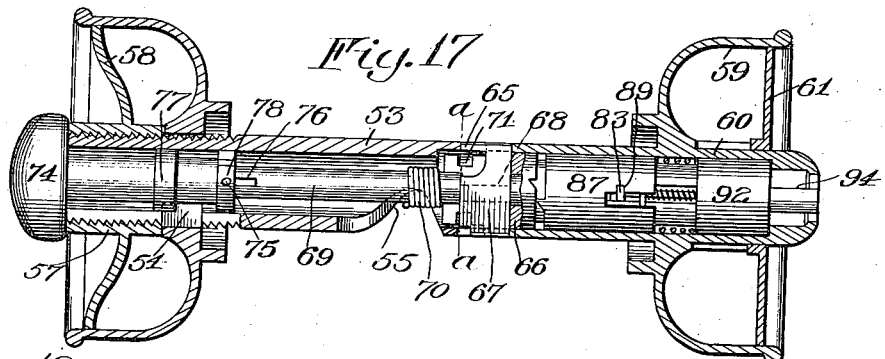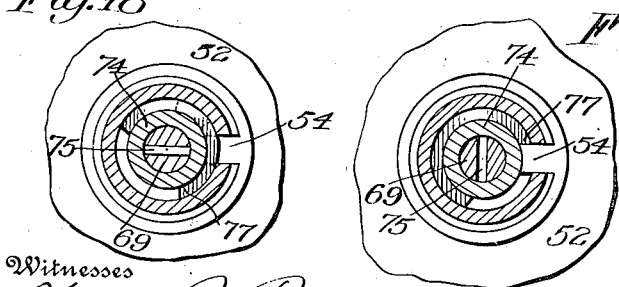

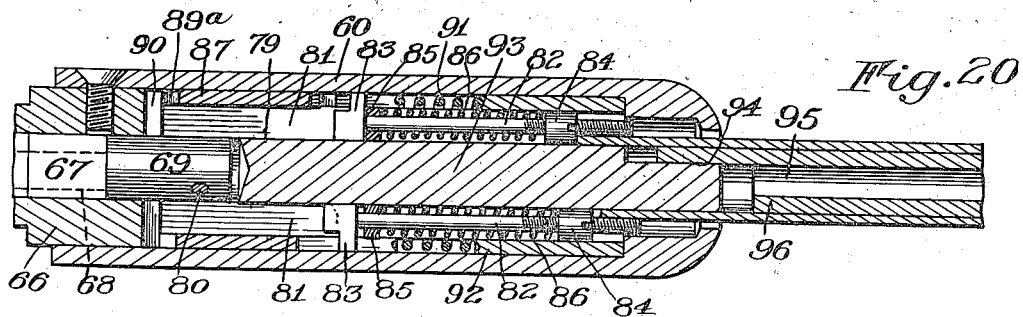
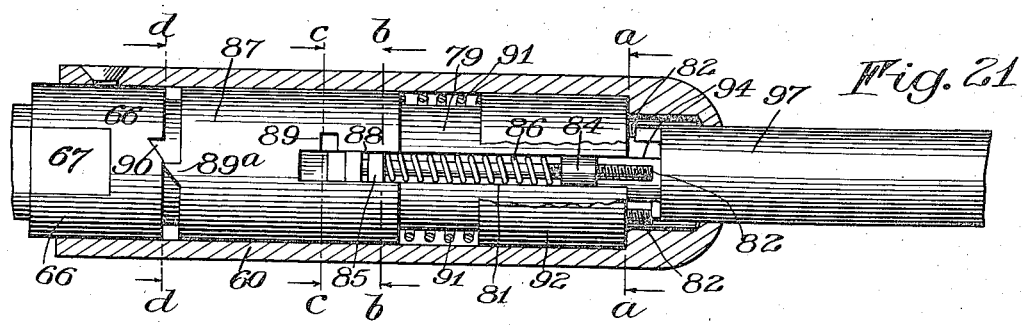
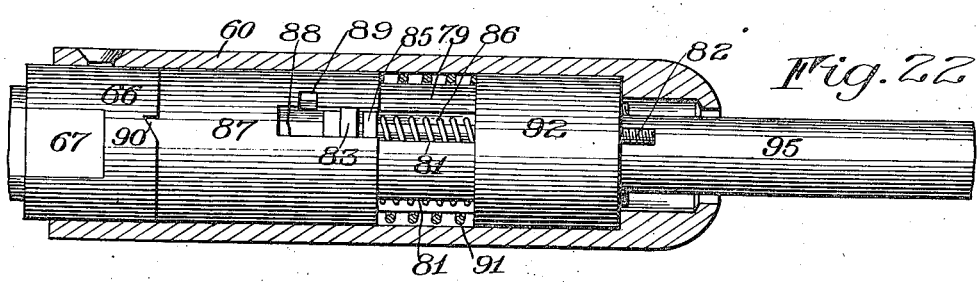
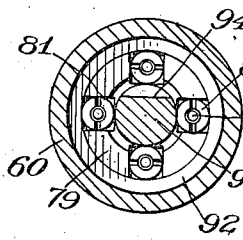
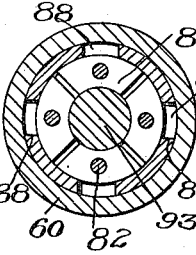
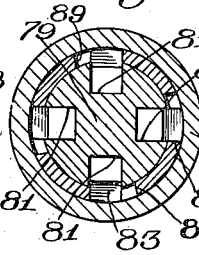
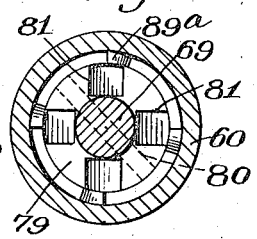

UNITED STATES PATENT OFFICE.

GEORGE H. VAN WINKLE, OF ROCHESTER, NEW YORK, ASSIGNOR OF ONE-FIFTH TO LUCIUS C. ATWATER, OF ROCHESTER, NEW YORK.

COMBINED LATCH AND LOCK.

1,128,392.          Specification of Letters Patent.     Patented Feb. 16, 1915.

Application filed September 29, 1911. Serial No. 651,989.

*To all whom it may concern:*

Be it known that I, GEORGE H. VAN WINKLE, of Rochester, in the county of Monroe and State of New York, have invented certain new and useful Improvements in Combined Latches and Locks, and I do hereby declare the following to be a full, clear, and exact description of the same, reference being had to the accompanying drawings, forming a part of this specification, and to the reference-numerals marked thereon.

The present invention relates to improvements in a combined latch and lock and has for one of its primary objects to provide a novel construction and arrangement of parts of neat appearance, and so disposed on and within a door and jamb as to expose the fewest possible projections, which are unsightly and liable to come in contact with the hand or clothing of a person passing through the doorway.

A further object is to provide a construction by which unnecessary material and parts are eliminated while the necessary strength is preserved, provision being made for taking up wear and for enabling a workman to apply the parts with greatest ease.

A further object is to enable the escutcheon plates and knobs to be secured to a door without the employment of any visible screws, and to reduce the friction of the working parts to a minimum.

A further object is to obviate the possibility of opening the door by inserting a thin strip of material against the beveled face of the latch to retract the same, thereby eliminating the necessity for an additional locking bolt, as commonly used.

A further object is to permit securing the knobs at any desired distance from the edge of the door, depending upon the width of the stile, the knobs being held in position by the presence of the strike plate.

A further object is the provision of a key mechanism, for controlling the lock, arranged in a comparatively small space and in a manner that renders it exceedingly difficult to be picked.

A further object is to enable the door to be opened from the inside, by a knob free to turn, and from the outside, by a knob which is normally locked and must first be unlocked, provision being made to enable the outside knob to remain unlocked for any length of time, so as to permit opening the door from either side without using a key, both knobs being free to turn under such conditions.

Further, the invention comprehends means for positively locking the latch against movement either from the outside or inside of the door, and for permitting the latch to be thrown, from the outside, without operating the knob, as usual, the last mentioned operation being under the control of suitable electric mechanism operating from the inside.

Another object of the invention consists in arranging a pivoted latch so as to operate in a novel and improved manner, whereby it is possible for the door to be closed quite easily, and with very little friction.

To these and other ends the invention consists in certain improvements and combinations of parts all as will be hereinafter more fully described, the novel features being pointed out in the claims at the end of the specification.

Figure 2:
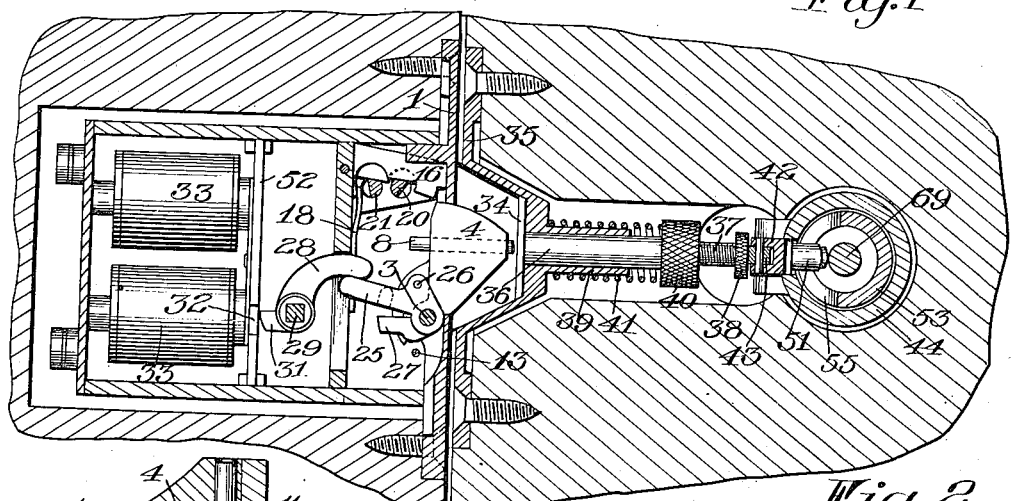
Figure 13:
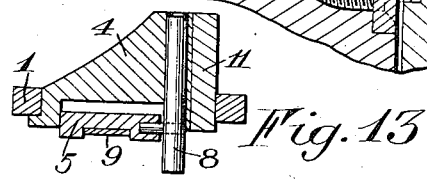
Figure 14:
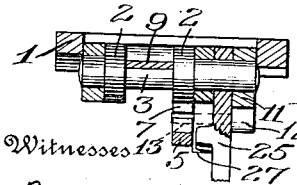

In the drawings: Figure 1 is a view in elevation, illustrating a portion of the outside of a door and jamb, with a preferred form of my combined lock and latch applied thereto; Fig. 2 is a vertical sectional view, taken in the direction of line *a—a* of Fig 3; Fig. 3 is a horizontal sectional view taken through the door and the jamb; Fig. 4 is a sectional view on the line *b—b* of Fig. 3; Fig. 5 is a detail sectional view on the line *c—c* of Fig. 3; Fig. 6 is a sectional view on the line *a—a* of Fig. 17; Fig. 7 is a view in elevation of the latch, and face plate for the same; Fig. 8 is a side elevation of the latch mechanism; Fig. 9 is a view in elevation of the latch mechanism, looking from the opposite side, and showing the electric controlling mechanism; Fig. 10 is a rear plan view of the face plate, and latch mechanism supported thereon; Fig. 11 is a vertical sectional view on the line *a—a* of Fig. 10; Fig. 12 is a similar view, with the latch locking-member in locking position; Fig. 13 is a detail sectional view, taken on the line *b—b* of Fig. 10; Fig. 14 is a detail sectional view on the line *c—c* of Fig. 10; Fig. 15 is a view in elevation of the back plate of the latch mechanism, showing the independent locking means, and the spring for controlling the latter; Fig. 16 is a vertical sectional view through the door, illustrating the controlling mechanism for the latch engaging plunger, the outer knob being in locked position; Fig. 17 is a transverse sectional view of the controlling mechanism shown in Fig. 16, the outer knob being unlocked so as to rotate with the inner knob; Fig. 18 is a detail sectional view, taken through the locking nut, and showing the latter in unlocking position to permit independent movement of the knob shafts; Fig. 19 is a similar view, showing the locking nut in locking position, causing the knob shafts to rotate together; Fig. 20 is a longitudinal sectional view of the tumbler-controlled lock mechanism; Fig. 21 is a view in elevation of the same, the knob shaft appearing in section, and the parts being locked; Fig. 22 is a similar view, showing the position of the parts when the barrel is rotated without the use of a proper key; Fig. 23 is a sectional view on the line $a$—$a$ of Fig. 21; Fig. 24 is a sectional view on the line $b$—$b$ of Fig. 21; Fig. 25 is a sectional view on the line $c$—$c$ of Fig. 21; and Fig. 26 is a sectional view on the line $d$—$d$ of Fig. 21.

Similar reference numerals throughout the several figures indicate the same parts.

Briefly, the invention, as disclosed in the present embodiment, comprises a latch, preferably arranged in the jamb of the door to engage a corresponding opening in the door, and pivoted on an axis disposed transversely of the jamb, so as to have an up and down swinging movement as the door is opened and closed. The latch is arranged to be retracted within the jamb of the door by a plunger arranged on the door and operated by suitable mechanism which may be actuated by a knob either from the inside or outside, the outside knob being normally locked against movement and requiring the use of a suitable key to effect movement of the plunger. The latch is suitably beveled on its operative face, to engage the strike plate and permit easy closing of the door, and is so arranged that after the door is closed, the latch can only be retracted within the jamb by the operation of the plunger in the door, except as hereinafter specified. That is to say, when the door is closed, the latch cannot be moved by the insertion of a thin strip of material against its operative surface, or in any other manner, except as mentioned, by reason of a locking member which is brought into locking relation with the latch by the closing of the door. The locking member may be released, to permit movement of the latch, either by the operation of the plunger in the door, or by means of an electrically controlled mechanism, as will hereinafter be described. The plunger in the door is preferably actuated by a lever, which is operatively connected to an inner rotary shaft carrying the inside knob, the outside knob being arranged on an outer rotary shaft, which is normally locked against movement, and adapted to be unlocked and connected to the inner shaft for movement therewith, upon the operation of suitable tumbler-controlled mechanism to be described. To these ends, there is provided a face plate 1 suitably secured to the jamb of the door, and provided with bearings, or ears 2 within which is arranged the pintle 3, the latter serving as a support for the swinging latch 4, which is formed on its operative face, as shown in the drawings, and is provided with a circumferentially disposed surface opposite its pivotal axis, said surface conforming substantially to an arc of a circle described about the axis of movement. The rear wall of the latch 4 is preferably recessed to form a seat for the locking member 5, which is loosely held therein by the spring 9 and carries a tooth 6 arranged to engage the coöperating projection 7 formed on one of the ears 2 of the face plate. The locking member 5 is connected by means of a suitable pin with the actuating plunger 8, which is movable through the latch, and adapted to extend beyond the operative face of the latch, for a purpose presently to be described. The locking member 5, together with the latch 4, are held in normal positions by means of the leaf spring 9, which is arranged as shown in Figs. 10 to 12, in engagement with a recessed portion of the pintle 3, whereby the pintle is held in proper operative position with relation to the parts which it controls. It is to be noted that the spring 9 is bowed, or sprung, toward its lower end, as indicated at 10, this serving to prevent it from losing its proper operative position with relation to the several coöperative parts, while at the same time causing them all to operate at the proper times, with their proper functions. The locking member is held in unlocking position, as shown in Fig. 11, by means of a releasing member designated at 11, the latter being pivotally arranged on the pintle 3 and provided with the tail piece 12 which carries the pin 13 arranged to engage beneath the lower end of the locking member 5, and move the same to unlocking position, such operation being effected by means of the spring 14, which is fixed to the face plate, and engages under the tail piece 12 of the releasing member, to hold the same in the position shown in Fig. 11, when the door is open. Upon movement of the door to closed position, the releasing member 11 is forced back by the movement of the latch and is held within the face plate by engagement with the strike plate on the door, the opening in the latter being of sufficient size to accommodate only the latch 4. When the releasing member is thus moved back and held in the position shown in Fig. 12, the pin 13 is moved away from the lower end of locking member 5, whereby the locking member 5 is released, and under the action of the spring 9, moves to engage the projection 7, and thereby prevent any movement of the latch 4 as long as the tooth 6 and projection 7 are engaged. In this position of the parts, the actuating plunger 8 is forced outwardly beyond the operative face of the latch, so that when the latch engaging plunger on the door is actuated, it first abuts against the actuating plunger 8, moving the same inwardly and thereby moving the locking member 5 to unlocking position, that is to say, disengaging it from the projection 7, further movement of the latch engaging plunger on the door serving to retract the latch and permit the door to open.

It is sometimes desirable to lock the latch, positively either from the inside or from the outside, to prevent any movement thereof, and to this end, in the present embodiment, there is provided a back plate 15, suitably attached to the face plate and carrying locking means preferably in the form of two independently pivoted plates 16 and 17, respectively, which are mounted on the back plate, and held in locking position by means of the arms of a bifurcated spring 18 which engage the locking plates at points adjacent to their pivotal axes, as shown in Figs. 11, 12 and 15. The locking means carry lugs 19 which are adapted to engage the rear wall of the latch, and prevent movement of the same. The locking means are shown in raised position in Figs. 11 and 12, to permit free movement of the latch, and are held in such position by means of the cam shafts 20 and 21 which are rotatably arranged in standards 22 on the back plate, and coöperate with the operative surfaces 23 on the locking devices. The cam shafts 20 and 21 carry suitable thumb nuts 24 and may be operated from the outside and inside of the door, respectively, and when either of the cam shafts is turned so as to release one or the other of the locking devices, the latch is positively held, and can not be retracted within the jamb of the door until the locking device is released.

Under certain conditions, as, for instance, in apartment houses, it is sometimes desirable to provide means for controlling the opening of a door from another part of the building, as by an electric push button, or other suitable connection, and to this end, in the present embodiment, I provide a lever 25 pivotally arranged on the pintle 3 and carrying a pin 26 adapted to engage the forward edge of the locking member 5. When the lever 25 is moved downwardly the locking member 5 is disengaged, and the latch retracted within the jamb of the door frame. The initial movement of the lever 25 causes the pin 26 to engage the locking member 5 to release the same, and continued movement of the lever causes it to engage the projection 27 at the rear of the latch, so as to actuate the latter. Movement of the lever 25 may be accomplished in any desirable manner, and to this end, in the present embodiment, I provide the rotatable actuator 28 mounted on the shaft 29 which carries the operating thumb piece 30 arranged outside the door. The actuator 28 is provided with a lug 31 which is normally engaged by the armature 32 of a suitable electro-magnet 33. When the electro-magnet is deënergized, the actuator 28 is locked against movement, and when the circuit is closed to energize the electro-magnet, the armature is attracted, releasing the actuator, and permitting a person outside the door to turn the thumb piece 30 and thereby depress the lever 25 to retract the latch and open the door.

The latch is arranged to be engaged, in the present embodiment, by a latch-engaging plunger 34, which is movable within a recess or opening in the strike plate 35, the latter being suitably secured to the door, as shown. The plunger 34 is carried by a suitable support, the same preferably comprising a sleeve 36 in threaded engagement with the post 37, which carries the knurled head 38 at its inner end. The sleeve 36 is movable within the collar 39 formed on the strike plate 35, said collar constituting a stop for limiting the movement of the plunger.

40 designates a knurled lock nut arranged to engage the post 37 and abutting the sleeve 36, so as to fix the position of the post relatively to the sleeve, a suitable coil spring 41 being provided between said lock nut and the base of the collar 39. The lock nut 40 has an overhanging flange, as shown, which serves to house the spring and to effect proper movement of the plunger, the spring serving normally to hold the plunger retracted, as shown in Figs. 2 and 3. The plunger is operatively connected to the inner knob of the door by means of the lever 42 which carries an anti-friction roller 43 in engagement with the head 38, said lever being pivotally mounted upon the sleeve 44 which is positioned within the door and held in proper relation thereto by means of the segmental lug 45 engaging a corresponding opening in the door. Said sleeve projects on opposite sides of the door, and is secured by means of suitable collars 46 and 47, respectively, which also serve to hold in place the escutcheon plates 48 and 49, the collar on the outside of the door being preferably locked in engagement with its escutcheon plate by means of a lug 50 engaging one of the coöperating recesses in the collar. The sleeve 44 is slotted, to receive the anti-friction roller 51 which is carried by the lever 42, and by which the latter is operatively connected to the inner knob of the door for operation thereby. The inner knob is designated at 52, the same being mounted on the inner rotary shaft 53, which is slotted at its inner end to receive a lug 54 carried by the knob and projecting beyond the inner surface of the rotary shaft, the latter being hollow, as shown. Said rotary shaft is preferably provided with a cam shaped opening as shown at 55 which is arranged to engage the anti-friction roller 51, so that as the shaft is rotated, in one direction or the other, the lever 42 will be actuated to move the plunger to the limit of its operation. The knob 52 is held in its proper position on the sleeve by means of the lock nut 56 and the coöperating collar 57, which preferably carries a closure plate 58.

The outer knob is designated at 59, being arranged on and preferably integral with the outer rotary shaft 60 which is suitably journaled within the sleeve 44, already described. The knob 59 is carried by the hollow shaft 60, a cover or name plate 61 being provided within the knob, 63 designating a ball bearing between the knob and the collar 46 to relieve the end thrust set up by the resistance of the parts against turning of the knob. It is to be noted that in assembling, or securing the parts, the inner and outer rotary shafts are positioned within the inner sleeve, the locking nut being next inserted within the inner rotary shaft, and finally the strike plate is attached, the latter serving to hold the rotary shafts and knobs securely locked in the door by reason of the engagement of the lever on the inner sleeve with the plunger support or the strike plate and with the cam opening in the inner rotary shafts. Thus, none of the parts can be removed while the strike plate is in operative position.

Under normal conditions, the outside knob, designated at 59, is locked against movement, except when released by the use of a key, at which time it is operatively connected with the inner rotary shaft so as to move therewith. To this end, in the present embodiment, the sleeve 44 is provided with a recess 64, which is arranged to receive a key 65, the latter being carried by the outer rotary shaft in a manner that will now be described. The collar 66 is fixedly secured to the hollow shaft 60 in any suitable manner, and has arranged therein for lateral movement the block 67 carrying the aforementioned key 65 which normally lies in engagement with the recess 64. The block 67 is arranged to be actuated by means of an eccentric 68 which is mounted on the spindle 69, the latter being held in normal position by means of a torsion spring 70, which has its opposite ends connected to said spindle and to the collar 66, respectively, said collar having an annular groove 71 formed therein to receive the lugs, or projections, 72 on the inner rotary shaft, the groove 71 having transverse openings to receive the lugs 72. The spindle 69 is arranged to be turned by a tumbler-controlled mechanism that will presently be described, and when thus turned, the key 65 is withdrawn from the recess 64 and engages a corresponding recess 73 in the inner rotary shaft, the outside handle being then free to turn and to operate the latch engaging plunger. Ordinarily, upon withdrawal of the key which controls the tumbler mechanism, the outer rotary shaft would be immediately relocked, but it is sometimes desirable to have said shaft remain unlocked, to permit persons to enter from the outside without the use of a key, and to this end, in the present embodiment, I have provided a means for temporarily locking the spindle 69 after it is once turned, so as to prevent movement thereof relatively to the inner rotary shaft. Said means preferably comprises the locking nut 74, which is preferably in the form of a hollow cylindrical member carrying a pin 75 at its inner end, which is arranged to engage a corresponding slot 76 in the spindle 69. The locking nut 74 is provided with annular shoulders 77 and 78, extending partially about the cylindrical member, as shown, and adapted for coöperative engagement with the lug 54, already described. Thus, when the locking nut 74 is in the position shown in Fig. 18, the spindle 69 is free to rotate within the inner rotary shaft. Upon unlocking the outer rotary shaft, the spindle being then turned a part of a revolution, the locking nut may be forced inwardly until the shoulder 77 engages with lug 54, as shown in Fig. 19, whereby the spindle is prevented from turning relatively to the inner rotary shaft, the inner and outer rotary shafts continuing to remain locked together in this manner as long as desired, and until the locking nut 74 is withdrawn to remove the shoulder 77 from engagement with the lug 54, this permitting the spindle to rotate so as to permit the key 65 to enter the recess 64 and re-lock the outer rotary shaft and knob against turning.

In order to free the outer rotary shaft to permit turning thereof, when desired, I have provided a tumbler-controlling mechanism arranged to be operated either by an individual key or by a master key, whereby the door may be opened from the outside. In such an arrangement, it is desirable to construct the parts in such a way that it will be impossible to pick the lock, or to open the door without the use of an authorized key, and to this end, in the present embodiment, there is provided a barrel 79 which is suitably attached to the spindle 69, as by means of a pin 80. The barrel is provided with a series of longitudinally arranged recesses or cutaway portions 81, in which are positioned the tumblers, each comprising, in the present embodiment, a stem 82 carrying at one end the block 83, and at its opposite end a nut 84 having threaded adjustment thereon. The stem 82 of each tumbler passes through a stationarily arranged shoulder 85, and positioned between each shoulder and the nut is a spring 86 which serves, normally, to hold the tumbler toward the outer end of the barrel. Surrounding the barrel 79 is a rotary sleeve 87 which is slotted longitudinally as indicated at 88, said slotted portion 88 being provided with the transversely arranged recesses, or notches, 89. The sleeve 87 carries a series of toothed projections 89ª, preferably formed as shown, and arranged to engage corresponding recesses 90 formed in the collar 66, the engagement of said projections and recesses taking place when the sleeve is rotated, unless the latter is held by means of the tumblers in a manner that will now be explained. Longitudinal movement of the sleeve is accomplished by means of coil spring 91 surrounding the barrel and arranged between the sleeve and the collar 92.

93 is a guide formed integral with the barrel 79 and provided with a flat side 94 which enters the key, designated at 95, and enables the latter to be readily positioned in proper relation to the tumblers. The key is provided with a shoulder 96 which engages the end of the guide 93 to limit its inward movement.

In Fig. 20, there is disclosed an individual key in coöperative engagement with the nuts 84 of the tumblers, which are about to be moved inwardly. As the key is forced against the tumblers, the blocks 83 are moved along until they are in alinement with the recesses 89 of the sleeve 87. Thereupon, the key may be turned, causing the blocks to enter said recesses and hold the sleeve. The springs of the tumblers being stronger than the spring which controls the sleeve 87, the latter is held out of locking engagement with the collar 66, so that the barrel may be rotated sufficiently to turn the spindle, to unlock the outer rotary shaft and connect it with the inner rotary shaft, as hereinbefore set forth. Upon releasing the key, the spindle and tumbler barrel are returned to their normal positions by means of the spring 70, already described. The master key for controlling the tumbler mechanism is designated at 97 and is arranged to engage the stems 82 of the tumblers. To obtain different permutations of the tumblers, the nuts 84 may be adjusted on stems 82 to any desired points, and thus a wide variety of combinations is made possible.

In the operation of the mechanism it will be apparent from what has already been said, that ordinarily, the inner knob of the door is free to turn and retract the latch, while the outer knob is locked. To release the outer knob, so as to operate the latch, a key must be employed to operate the tumbler mechanism. This causes the outer knob to be coöperatively engaged with the inner knob, and if desirable, the parts may be held in this position by operating the locking nut of the inner knob while the key is inserted in the outer knob. The key may then be removed, and the knobs will remain locked together until the locking nut is withdrawn.

While I have disclosed the several features of my invention in certain preferred embodiments, it is to be understood that the improvements are susceptible of many variations and changes without departing from the essential ideas of the invention, and I intend to cover by this application any modifications that may come within the terms, generally, of the claims hereinafter.

I claim as my invention:

1. The combination with a door and a jamb, of a latch mounted on one of said parts, a latch engaging plunger mounted on the other of said parts, and a locking member adapted to lock the latch when the door is closed and to be released upon the initial movement of the latch engaging plunger.

2. The combination with a door and a jamb, of a latch mounted on one of said parts and adapted to engage an opening in the other part, a knob operating to eject the latch from the opening, and a locking member arranged to lock the latch when the door is closed and to be released upon the initial turning movement of the knob.

3. The combination with a door and a jamb, of a latch swingingly mounted on one of said parts and adapted to engage an opening in the other part, a latch engaging plunger mounted on the other of said parts, and a locking member adapted to lock the latch when the door is closed and to be released upon the initial movement of the latch engaging plunger.

4. The combination with a door and a jamb, of a latch swingingly mounted on one of said parts and adapted to engage an opening in the other of said parts, a knob operating to eject the latch from the opening, and a locking member arranged to lock the latch when the door is closed and to be released upon the initial turning movement of the knob.

5. The combination with a door and a jamb, of a latch mounted on the jamb, a latch engaging plunger mounted on the door, and a locking member adapted to lock the latch when the door is closed and to be released upon the initial movement of the latch engaging plunger.

6. The combination with a door and a jamb, of a latch swingingly mounted on the jamb, a latch engaging plunger mounted on the door, and a locking member adapted to lock the latch when the door is closed and to be released upon the initial movement of the latch engaging plunger.

7. The combination with a door and a jamb, of a latch mounted on the jamb and adapted to engage an opening in the door, a knob operating to eject the latch from the opening, and a locking member arranged to lock the latch when the door is closed and to be released upon the initial turning movement of the knob.

8. The combination with a door and a jamb, of a latch swingingly mounted on the jamb and adapted to engage an opening in the door, a knob operating to eject the latch from the opening, and a locking member arranged to lock the latch when the door is closed and to be released upon the initial turning movement of the knob.

9. The combination with a door and a jamb, of a face plate carried by one of said parts, a latch pivotally mounted on the face plate and coöperating with an opening in the other of said parts, independent locking means operable from the inside and outside, respectively, to prevent movement of the latch, and a bifurcated spring adapted to hold both locking means in normal position.

10. The combination with a face plate, of a pintle loosely arranged in bearings on the face plate, a latch pivoted on the pintle, and a leaf spring coöperating with the pintle and latch to hold the same in normal position.

11. The combination with a face plate, of a pintle loosely arranged in bearings on the face plate, a latch pivoted on the pintle, a locking member pivotally mounted on the latch and adapted to prevent movement of the latter, and a leaf spring coöperating with the pintle and latch to hold the same in normal position, and with the locking member to effect movement of the same to locking position.

12. The combination with a face plate, of a latch swingingly mounted on the face plate, a stationary abutment arranged on the face plate, and a locking member pivotally supported on the latch and adapted to engage said abutment.

13. The combination with a door and a jamb, of a face plate, a latch swingingly mounted on the face plate, a stationary abutment arranged on the face plate, a locking member pivotally supported on the latch and adapted to engage said abutment, a spring controlled releasing member movable with the latch and coöperating with the locking member to hold the same out of engagement with the abutment when the door is open and to permit its engaging the abutment when the door is closed, and an actuating plunger movable beyond the operative face of the latch and adapted to effect movement of the locking member away from its abutment.

14. The combination with a door and a jamb, of a latch mounted in one of said parts and coöperating with an opening in the other of said parts, a plunger movable within the opening to effect operation of the latch, a support for the plunger, and a lever arranged to engage and actuate the support, said support being adjustable to accommodate varying distances between the lever and the latch.

15. The combination with a door and a jamb, of a latch mounted in the jamb and coöperating with an opening in the door, a plunger movable within the opening to effect operation of the latch, a support for the plunger comprising a sleeve, and a stem threaded within the sleeve, and a lever arranged to engage the stem and actuate the plunger.

16. The combination with a door, of a slotted sleeve arranged transversely within the door, a lever pivotally mounted on the sleeve adjacent to the slotted portion, a lug carried by the sleeve and adapted to engage a corresponding opening in the door, and collars adapted to have threaded engagement with the opposite ends of the sleeve.

17. The combination with a door, of a movable plunger arranged therein, a support for the plunger, a lever adapted to engage and move the support, a sleeve, an inner rotary shaft arranged in the sleeve and having operative engagement with the lever, and an outer rotary shaft normally locked against movement and adapted to be released and connected to the inner shaft for movement with the latter.

18. The combination with a door, of a movable plunger arranged therein, a support for the plunger, a lever adapted to engage and move the support, a sleeve, an inner rotary shaft arranged in the sleeve and having operative engagement with the lever, an outer rotary shaft normally locked against movement, and a key carried by the outer shaft and movable transversely thereof to engage alternately with recesses in the sleeve and in the inner shaft, respectively.

19. The combination with a door, of a sleeve arranged in the door, a shaft rotatable within the sleeve, a knob slidably arranged on the shaft, and a pair of collars having threaded engagement with the shaft on opposite sides of the knob whereby the latter is held in adjusted position.

20. The combination with a door, of a movable plunger arranged therein, a support for the plunger, a lever adapted to engage and move the support, a sleeve, an inner rotary shaft arranged in the sleeve and having operative engagement with the lever, an outer rotary shaft normally locked against movement, a key carried by the outer shaft and movable transversely thereof to engage alternately with recesses in the sleeve and in the inner shaft, respectively, said key being normally engaged with the recess in the sleeve, and means for retaining the key in engagement with the recess in the inner shaft.

21. The combination with a door, of a movable plunger arranged therein, a support for the plunger, a lever adapted to engage and move the support, a sleeve, an inner rotary shaft arranged in the sleeve and having operative engagement with the lever, an outer rotary shaft, a spring controlled spindle journaled within the outer shaft and extending into the inner shaft, an eccentric mounted on the spindle, a block arranged to move transversely of said outer shaft and operated by the eccentric, a key carried by the block and adapted to engage alternately with recesses in the sleeve and in the inner shaft respectively, and means for retaining the inner shaft and the spindle against relative movement.

22. The combination with a door, of a movable plunger arranged therein, a support for the plunger, a lever adapted to engage and move the support, a sleeve, an inner rotary shaft arranged in the sleeve and having operative engagement with the lever, an outer rotary shaft, a spring controlled spindle journaled within the outer shaft and extending into the inner shaft, an eccentric mounted on the spindle, a block arranged to move transversely of said outer shaft and operated by the eccentric, a key carried by the block and adapted to engage alternately with recesses in the sleeve and in the inner shaft respectively, said spindle being slotted at its inner end, a locking nut arranged within the inner shaft and surrounding the slotted end of the spindle, a pin arranged transversely of the locking nut and coöperating with the slotted portion of the spindle, and shoulders on the nut arranged for locking engagement with a lug projecting from the inner shaft.

23. The combination with a door, of a movable plunger arranged therein, a support for the plunger, a lever adapted to engage and move the support, a sleeve, an inner rotary shaft arranged in the sleeve and having operative engagement with the lever, an outer rotary shaft normally locked against movement, and tumbler controlled means for releasing the outer shaft and connecting it to the inner shaft for movement therewith.

24. The combination with a door, of a movable plunger arranged therein, a support for the plunger, a lever adapted to engage and move the support, a sleeve, an inner rotary shaft arranged in the sleeve and having operative engagement with the lever, an outer rotary shaft normally locked against movement, a key carried by the outer shaft and movable transversely thereof to engage alternately with recesses in the sleeve and in the inner shaft respectively, and tumbler controlled means for moving the key.

25. The combination with a door, of a movable plunger arranged therein, a support for the plunger, a lever adapted to engage and move the support, a sleeve, an inner rotary shaft arranged in the sleeve and having operative engagement with the lever, an outer rotary shaft, a spring controlled spindle journaled within the outer shaft, and extending into the inner shaft, an eccentric mounted on the spindle, a block arranged to move transversely of said outer shaft and operated by the eccentric, a key carried by the block and adapted to engage alternately with recesses in the sleeve and in the inner shaft respectively, and tumbler controlled means for turning the spindle.

26. The combination with a door, of a movable plunger arranged therein, a support for the plunger, a lever adapted to engage and move the support, a sleeve, an inner rotary shaft arranged in the sleeve and having operative engagement with the lever, an outer rotary shaft normally locked against movement, and tumbler controlled means for releasing the outer shaft and connecting it to the inner shaft, comprising a rotary barrel, tumblers supported by the barrel, a spring controlled sleeve surrounding the barrel, a projection on the sleeve, and a stationary collar having a recess coöperating with the aforementioned projection, the sleeve being provided with recesses to receive the tumblers of the barrel whereby the projection on the sleeve may be held out of engagement with said recess in the collar.

27. The combination with a door, of a movable plunger arranged therein, a support for the plunger, a lever adapted to engage and move the support, a sleeve, an inner rotary shaft arranged in the sleeve and having operative engagement with the lever, an outer rotary shaft, a spindle journaled in the outer rotary shaft and operatively connected to a key adapted to lock the outer and inner shafts together, a barrel secured to the end of the spindle, tumblers supported by the barrel, a spring controlled sleeve surrounding the barrel, a projection on the sleeve, and a stationary collar surrounding the spindle and having a recess coöperating with the aforementioned projection, the sleeve being provided with recesses to receive the tumblers of the barrel.

28. The combination with a rotary spindle, of a barrel connected thereto having longitudinal recesses, tumblers arranged in the recesses, a spring controlled sleeve surrounding the barrel, said sleeve being longitudinally slotted to receive the aforesaid tumblers and having openings extending laterally from the slotted portions to permit lateral movement of the tumblers relatively to the sleeve, a projection on the sleeve, and a stationary collar surrounding the spindle having a recess coöperating with the aforesaid projection whereby to prevent movement of the barrel when the projection on the sleeve engages the recess in the collar.

29. The combination with a rotary spindle, of a barrel connected thereto having longitudinal recesses, tumblers arranged in the recesses, each comprising a stem movable through a stationary shoulder, a block secured to one end of the stem, a nut threaded on the opposite end of the stem, and a spring arranged between the nut and the shoulder, a spring controlled sleeve surrounding the barrel, said sleeve being longitudinally slotted to receive the aforesaid blocks and having openings extending laterally from the slots to permit lateral movement of the tumblers relatively to the sleeve, a projection on the sleeve, and a stationary collar surrounding the spindle having a recess coöperating with the aforesaid projection whereby to prevent movement of the barrel when the projection on the sleeve engages the recess in the collar.

30. The combination with a door, of a movable plunger arranged therein, a support for the plunger, a lever adapted to engage and move the support, a sleeve, an inner rotary shaft arranged in the sleeve and having operative engagement with the lever, an outer rotary shaft normally locked against movement, means for releasing the outer shaft and connecting it to the inner shaft for movement therewith, and means for retaining the connection between the outer and inner shafts.

GEORGE H. VAN WINKLE.

Witnesses:
H. E. STONEBRAKER,
RUSSELL B. GRIFFITH.